(12) United States Patent
Makke et al.

(10) Patent No.: US 11,973,847 B2
(45) Date of Patent: Apr. 30, 2024

(54) INTELLIGENT TICKETING AND DATA OFFLOAD PLANNING FOR CONNECTED VEHICLES

(71) Applicant: FORD GLOBAL TECHNOLOGIES, LLC, Dearborn, MI (US)

(72) Inventors: Omar Makke, Lyon Township, MI (US); Jeremy Lerner, Southfield, MI (US); Oleg Yurievitch Gusikhin, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 19 days.

(21) Appl. No.: 17/571,695

(22) Filed: Jan. 10, 2022

(65) Prior Publication Data

US 2023/0224379 A1    Jul. 13, 2023

(51) Int. Cl.
*G07C 5/00* (2006.01)
*H04L 67/61* (2022.01)
*H04L 67/12* (2022.01)

(52) U.S. Cl.
CPC ............ *H04L 67/61* (2022.05); *G07C 5/008* (2013.01); *H04L 67/12* (2013.01)

(58) Field of Classification Search
CPC ................................. H04L 67/61; G07C 5/008
USPC .................... 709/203, 217, 219, 223–224
See application file for complete search history.

(56) References Cited

U.S. PATENT DOCUMENTS

| 7,616,642 | B2 | 11/2009 | Anke et al. | |
|---|---|---|---|---|
| 10,455,445 | B2 | 10/2019 | Das et al. | |
| 10,735,518 | B2 | 8/2020 | Magalhaes de Matos | |
| 2016/0234128 | A1 | 8/2016 | Robertson et al. | |
| 2021/0105152 | A1* | 4/2021 | Padinhakara | H04L 67/12 |
| 2021/0116938 | A1* | 4/2021 | Sun | G06F 16/22 |
| 2022/0103653 | A1* | 3/2022 | Sorrentino | H04W 4/70 |

FOREIGN PATENT DOCUMENTS

WO     2020205597 A1    10/2020

* cited by examiner

*Primary Examiner* — Younes Naji
*Assistant Examiner* — Da T Ton
(74) *Attorney, Agent, or Firm* — Joseph Zane; Brooks Kushman P.C.

(57) ABSTRACT

Intelligent ticketing and data offload planning is provided. A data center receives a ticket request from a vehicle requesting to perform a data upload of vehicle data over a communications network. An optimizer is utilized to generate a ticket, the ticket specifying a time and a location for the vehicle to perform the data upload. The ticket is received from the vehicle. The ticket is validated to ensure that the vehicle should still perform the data upload. The vehicle is indicated to perform the data upload over the communications network responsive to the optimizer confirming the data upload to proceed. The data upload is stored to a storage of the data center.

17 Claims, 5 Drawing Sheets

INTELLIGENT TICKETING AND DATA OFFLOAD PLANNING FOR CONNECTED VEHICLES

TECHNICAL FIELD

Aspects of the disclosure generally relate to intelligent ticketing and data offload planning for connected vehicles.

BACKGROUND

Vehicles may utilize their sensors to generate terabytes of data. It is expected for vehicles to continue to generate even greater quantities of data. This may cause vehicles to offload data to the cloud more frequently, with a much larger data size. 5G technology has emerged to handle the large amount of data required to be transferred.

SUMMARY

In a first illustrative example, a data center for intelligent ticketing and data offload planning is provided. The data center includes a storage for maintaining data uploads. The data center also includes a computing device programmed to execute an optimizer to perform operations including to receive a ticket request from a vehicle requesting to perform a data upload of vehicle data over a communications network, utilize the optimizer to generate a ticket, the ticket specifying a time and a location for the vehicle to perform the data upload, receive the ticket from the vehicle, validate the ticket to ensure that the vehicle should still perform the data upload, indicate to the vehicle to perform the data upload over the communications network responsive to the optimizer confirming the data upload to proceed, and store the data upload to the storage.

In a second illustrative example, a method for an intelligent ticketing and data offload planning is provided. A data center receives a ticket request from a vehicle requesting to perform a data upload of vehicle data over a communications network. An optimizer is utilized to generate a ticket, the ticket specifying a time and a location for the vehicle to perform the data upload. The ticket is received from the vehicle. The ticket is validated to ensure that the vehicle should still perform the data upload. The vehicle is indicated to perform the data upload over the communications network responsive to the optimizer confirming the data upload to proceed. The data upload is stored to a storage of the data center.

In a third illustrative example, a non-transitory computer-readable medium includes instructions for intelligent ticketing and data offload planning that, when executed by one or more computing devices, cause the one or more computing devices to perform operations including to receive, to a data center, a ticket request from a vehicle requesting to perform a data upload of vehicle data over a communications network; utilize an optimizer to generate a ticket, the ticket specifying a time and a location for the vehicle to perform the data upload; receive the ticket from the vehicle; validate the ticket to ensure that the vehicle should still perform the data upload; indicate to the vehicle to perform the data upload over the communications network responsive to the optimizer confirming the data upload to proceed; and store the data upload to a storage of the data center.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Data needs for vehicles continue to increase. However, not all areas may be covered by technologies such as 5G that enable higher data throughput. Thus, if thousands of vehicles are configured to offload data through 4G or earlier technologies, the cell towers in such an area may reach capacity. Moreover, even where 5G or better technology is available, the burden on cloud infrastructure to handle the large volumes of data may continue to grow. A cloud system may be configured to receive the data and store it in a data center for later use. It is desirable to maintain a steady data flow to the data center as opposed to encountering spikes or other variations in usage. If a vehicle attempts to send data to the cloud and the connection is slow, then the transfer may take an excessive time and cause a potential for battery drain or data corruption. Also, the vehicle may not have the storage space for new data, so some data, either old or new, may be discarded if data is not transferred. Aspects of the disclose relate to an approach to mitigate these issues.

Figure 1:
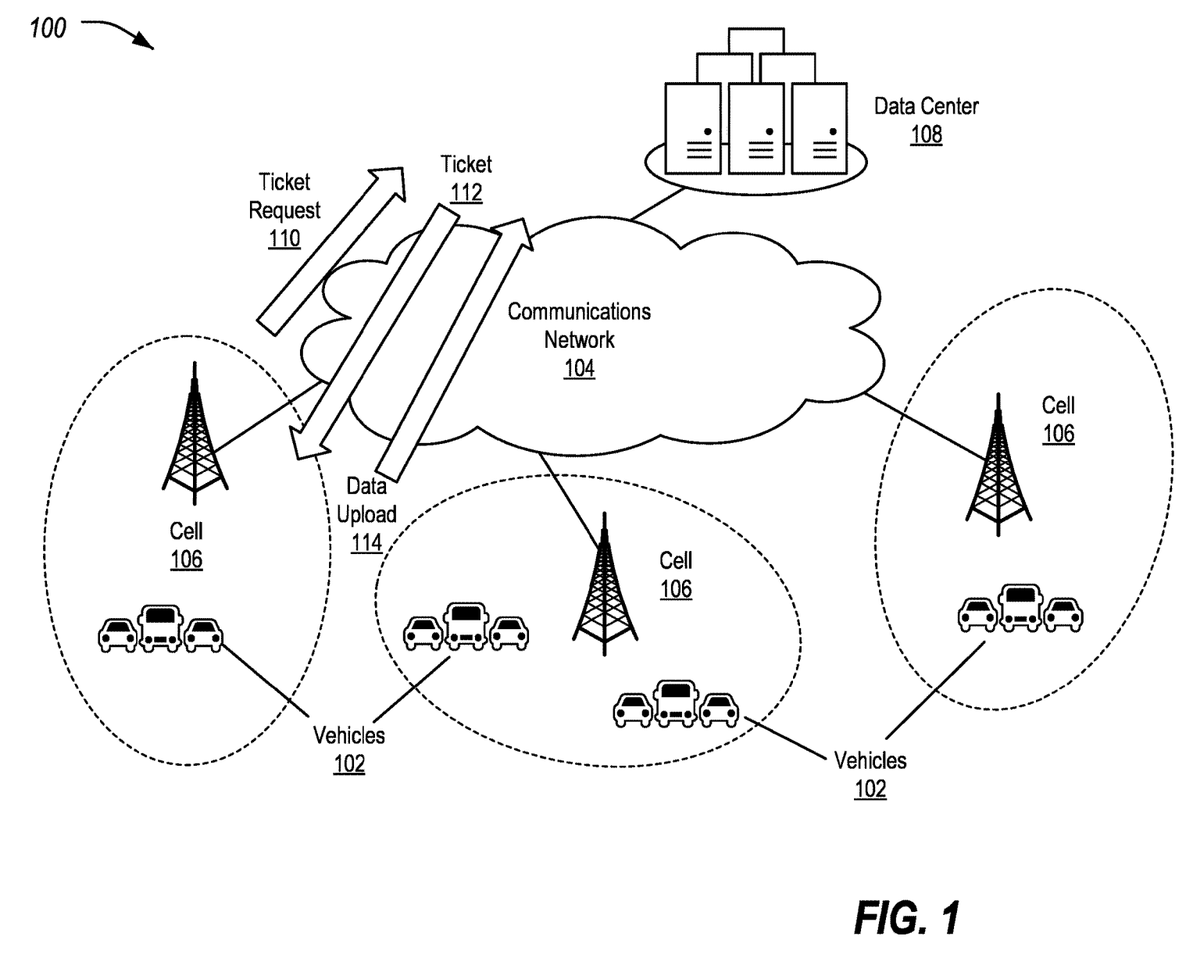
FIG. 1 illustrates an example system for intelligent ticketing and data offload planning for connected vehicles.

FIG. 1 illustrates an example system 100 implementing an intelligent ticketing and data offload planning for connected vehicles 102. The system 100 may include one or more vehicles 102 configured to provide data over a communications network 104 to a data center 108. The communications network 104 may include various cells 106 configured to communicate with the vehicles 102. It should be noted that the system 100 is an example, and systems 100 including more, fewer, and differently located vehicles 102, cells 106 and data centers 108 may be utilized.

The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle, a parallel hybrid electrical vehicle, or a parallel/series hybrid electric vehicle. Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include network hardware configured to facilitate communication between the vehicle and other devices of the system 100. For example, the vehicle 102 may include or otherwise access a cellular modem configured to facilitate communication with a communications network 104. The communications network 104 may include one or more interconnected communication networks such as the Internet, a cable television distribution network, a satellite link network, a local area network, and a telephone network, as some non-limiting examples. As another example, the vehicle 102 may utilize one or more of BLUETOOTH, ultra wideband (UWB), Wi-Fi, or universal serial bus (USB) network connectivity to facilitate communication with the communications network 104 via a user's mobile device. Further aspects of the operation of vehicles 102 are discussed with respect to FIG. 2.

The communications network 104 may include a plurality of cells 106. Each cell 106 may be served by one or more cellular towers, and may have capacity limits based on the physical capacity of the one or more cellular towers and/or the geography of the physical area of the cell 106.

The vehicle 102 may communicate over the communications network 104 with the data center 108 via connection to one of the cells 106 of the communications network 104. The data center 108 may be an example of one or more networked computing devices that are accessible to the vehicle 102 over the communications network 104.

The data center 108 may include one or more computing devices configured to communicate with the vehicles 102 over the communications network 104. The data center 108 may be configured to receive ticket requests 110 from the vehicles 102. The ticket requests 110 may include metadata from the vehicle 102 making the request to allow the data center 108 to determine how to handle the ticket requests 110. Responsive to receipt of a ticket request 110, the data center 108 may be configured to send a ticket 112 to the vehicle 102. The ticket 112 include information with respect to when the vehicle 102 may make a data upload 114 and what information may be uploaded. The data center 108 may be further configured to validate the ticket 112 as received by the data center 108 to receive the data upload 114 from a vehicle 102. Further aspects of the operation of data center 108 is discussed with respect to FIG. 3.

Figure 2:
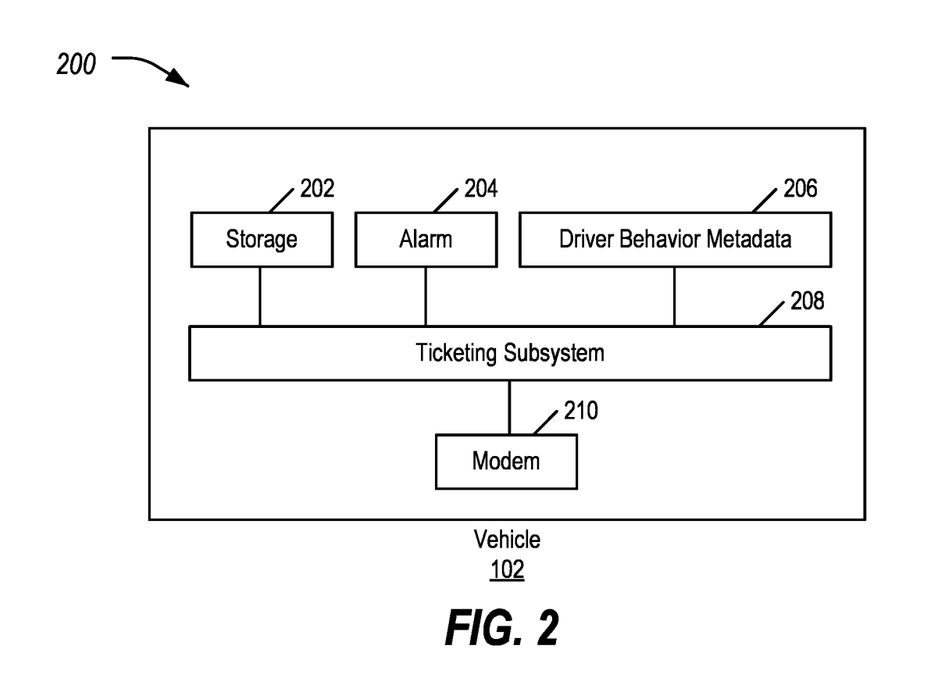
FIG. 2 illustrates an example of further details of the components of the vehicles.

FIG. 2 illustrates an example 200 of further details of the components of the vehicles 102. As shown, the vehicle 102 in the example 200 may include a storage 202, an alarm 204, driver behavior metadata 206, a ticket subsystem 208, and a modem 210. It should be noted that this is merely an example, and vehicles 102 having more, fewer, and/or different components may be utilized.

The storage 202 may include one or more non-transitory memories configured to maintain vehicle data to be uploaded. As the storage 202 may be of a fixed size, the storage 202 may not be able to store data for the vehicle 102 without performing periodic data uploads 114 and data purges of the uploaded data.

The alarm 204 may include functionality configured to generate an alert responsive to occurrence of one or more conditions. These conditions may include, as one example, the occurrence of date and time specified by a ticket 112. In an example, the date and time may be specified as a time to start the download. In another example, the date and time may be specified as a time window, having a beginning and an ending time, during which the transfer may be scheduled to take place. When the ticket 112 is issued, the vehicle 102 may expect to reach a certain location at a certain time, but then traffic may change and/or the driver may decide to divert from their route as planned when the ticket 112 was issued. As more examples, the ticket 112 may be valid for a time and multiple possible locations, and/or for a time window and one location. The location may in many examples indicate a cellular tower reception area, but in some cases the location may be specified as one or more geofences, postal addresses, point of interests, etc., within that area.

The driver behavior metadata 206 may include information indicative of various aspects of the operation of the vehicle 102. In an example, the driver behavior metadata 206 may indicate a type of the vehicle 102. In another example, the driver behavior metadata 206 may indicate driver route and behavior history (e.g., historical times, routes, places the vehicle 102 has traveled and when) to predict how long the vehicle 102 will be driving for (and the upcoming connectivity status, given a map of connectivity mentioned below). In yet another example the driver behavior metadata 206 may include an importance of the data as determined by the vehicle 102. For instance, this importance may relate to event-based data collection requirements of the vehicle 102. The driver behavior metadata 206 may also include planned routes for the vehicle 102. This may involve historical data being used to estimate future routes, and/or the driver may having programmed routes for specific times (e.g., in a calendar with times and locations).

Figure 3:
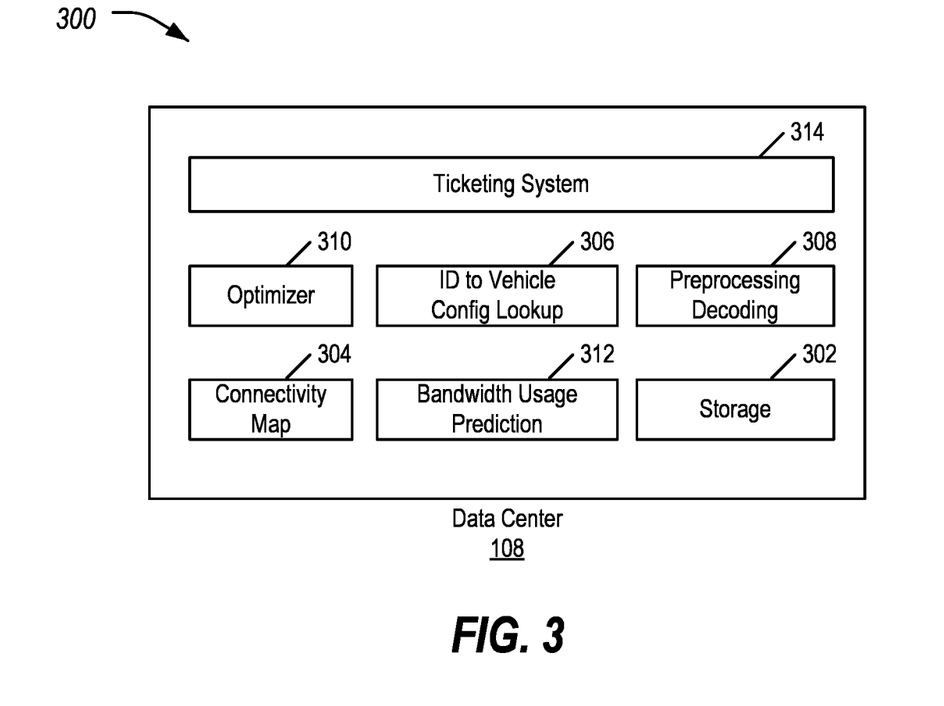
FIG. 3 illustrates an example of further details of the components of the data center.

FIG. 3 illustrates an example 300 of further details of the components of the data center 108. As shown, the data center 108 in the example 300 includes a storage 302, a connectivity map 304, an identifier to vehicle configuration lookup 306, a preprocessing decoding 308, an optimizer 310, a bandwidth user prediction 312, and a ticketing system 314.

The storage 302 may include one or more non-transitory memories configured to maintain information useful for the operation of the data center 108. In an example, the storage 302 may include information received by the vehicles 102 and stored by the data center 108. For instance, this information may include the data uploads 114 and the driver behavior metadata 206.

The connectivity map 304 may include information descriptive of operation of the connectivity of the communications network 104. For instance, the connectivity map 304 may include information indicative of the bandwidth available at each of the cells 106 of the communications network 104, quantities of users connected to the communications network 104 via the cells 106, dead spots where the cells 106 are unable to reach, etc. The connectivity map 304 may indicate areas having sufficient bandwidth, as well as areas for which the bandwidth is limited, e.g., due to wireless congestion and/or due to processing capacity.

The vehicle configuration lookup 306 may include information linking unique identifiers of the vehicles 102 to configuration aspects specific to the identified vehicles 102.

The unique identifiers may include VINs as defined in International Organization for Standardizations (ISOs) 3779 and 4010, globally unique identifiers (GUIDs), or other identifiers specific to the vehicles 102. The configuration aspects may include vehicle type (e.g., electric powered, gasoline powered), vehicle size, historical vehicle 102 routes, etc.

The preprocessing decoding 308 may be configured to receive the ticket requests 110 for initial analysis. For instance, the preprocessing decoding 308 may identify the quantity of data indicated by the vehicles 102 as being requested to provide in data uploads 114 to the data center 108.

The bandwidth user prediction 312 may be information computed by the data center 108 that indicates, for each cell 106 and/or for the data center 108 overall, how much bandwidth and/or compute resources are expected to be required by each cell 106 by the data center 108 for various time periods. The optimizer 310 may be programmed to determine the bandwidth user prediction 312 based on the ticket requests 110 received to the data center 108 from the vehicles 102.

The ticketing system 314 may be configured to send tickets 112 to the vehicles 102 responsive to the ticket requests 110. For instance, the ticketing system 314 may access the received ticket requests 110 processed by the preprocessing decoding 308, utilize the bandwidth user prediction 312 to determine the requested bandwidth to handle the data uploads 114, and schedule the data uploads 114 based on the result. The ticketing system 314 may send tickets 112 to the vehicles 102 indicating time and/or other trigger conditions (e.g., vehicle cell 106 location on the communications network 104, etc.) for the vehicles 102 sending the data uploads 114 to the data center 108.

Figure 4:
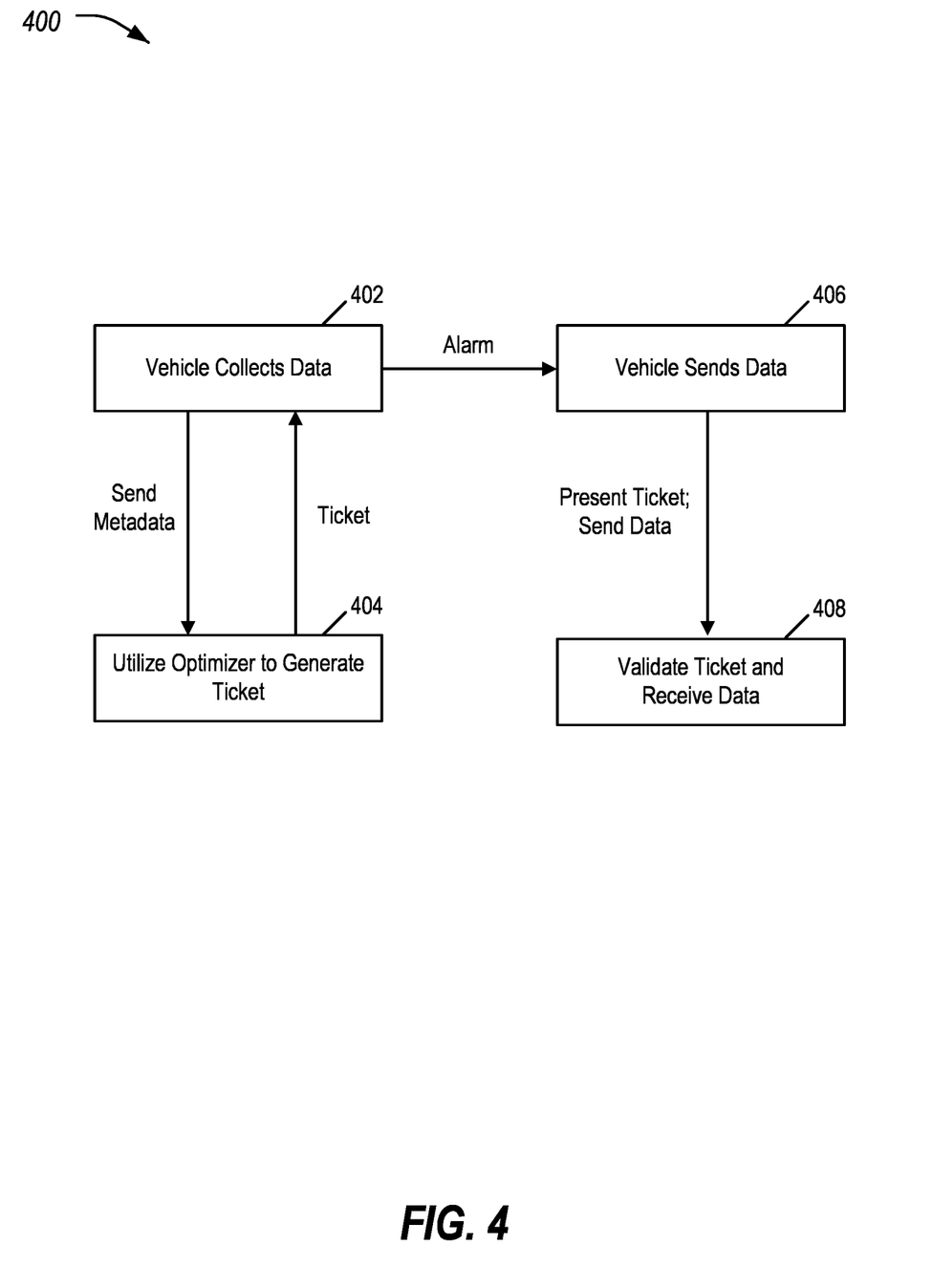
FIG. 4 illustrates an example data flow diagram for the operation of the system.

FIG. 4 illustrates an example data flow diagram 400 for the operation of the system 100. As shown at box 402, the vehicle 102 may collect data for the data upload 114. The vehicle 102 may send a ticket request 110 to the data center 108 including the driver behavior metadata 206. As shown at box 404, responsive to receiving the ticket request 110, the data center 108 may send the vehicle 102 a ticket 112. The ticket 112 may indicate the time and/or other trigger conditions to occur for the vehicle 102 to send the data upload 114. As shown at box 406, responsive to occurrence of the conditions, the vehicle 102 may send the data upload 114 to the data center 108. This may include the vehicle 102 presenting the ticket 112 for verification by the data center 108 as well as the actual upload of the data upload 114 responsive to the ticket 112 being verified by the data center 108, as shown at box 408.

Figure 5:
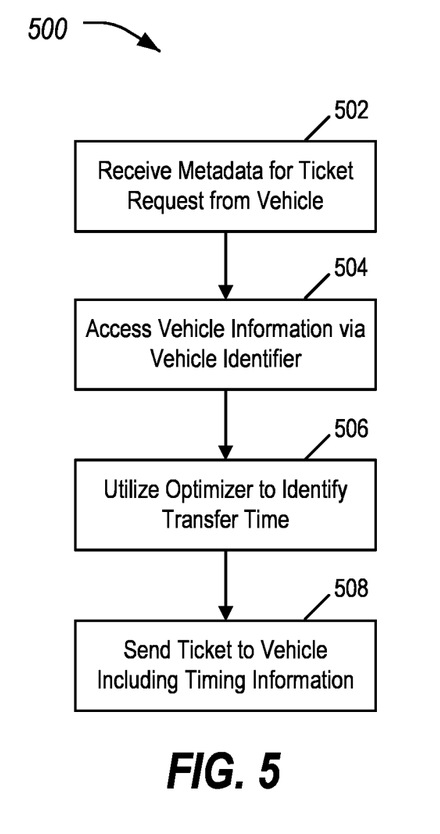
FIG. 5 illustrates an example process including further details of the operation of the data center with respect to the data flow diagram of FIG. 4.

FIG. 5 illustrates an example process 500 including further details of the operation of the data center 108 with respect to the data flow diagram 400. In an example, the process 500 may be performed by the data center 108 in the context of the system 100.

At operation 502, the data center 108 receives driver behavior metadata 206 for the ticket requests 110 from the vehicle 102. In an example, the vehicles 102 may send the ticket request 110 periodically, or responsive to the storage 202 of the vehicle 102 being full with vehicle 102 data. The ticket request 110 may additionally include a unique identifier of the vehicle 102. The ticket requests 110 may also include driver behavior metadata 206 specifying various aspects of the requested transfer. In an example, the driver behavior metadata 206 may indicate a type of the vehicle 102. In another example, the driver behavior metadata 206 may indicate driver route and behavior history to predict how long the vehicle 102 will be driving for (and the upcoming connectivity status, given a map of connectivity mentioned below). In yet another example the driver behavior metadata 206 may include an importance of the data as determined by the vehicle 102. For instance, this importance may relate to event-based data collection requirements of the vehicle 102. The data center 108 may use the vehicle-provided driver behavior metadata 206 in conjunction with stored information about the driver and vehicle 102 (e.g., vehicle type, such as BEV or internal combustion engine (ICE)) to determine a priority for the data that is still on the vehicle 102.

At operation 504, the data center 108 utilizing an identifier of the vehicle 102 to retrieve vehicle 102 information from the vehicle configuration lookup 306. In an example, the data center 108 retrieves the unique vehicle identifier from the ticket request 110 and retrieves a record from the vehicle configuration lookup 306 specific to the vehicle 102. The record may specify information about the vehicle 102

At operation 506, the data center 108 utilizes the optimizer 310 to identify the transfer time and other parameters of the data upload 114. The optimizer 310 may utilize information from the storage 302, such as the maximum bandwidth possible which should not be exceeded, and the maximum bandwidth per area which indicates how much data can arrive from a specific cell 106 or other geographical location.

The optimizer 310 may consider various factors. For instance, for internal combustion powered vehicles 102, data transmission may be preferred to be performed while the vehicle 102 is on (to avoid battery drain). In contrast, for plug-in electric vehicles 102, the battery use is generally less of a concern (and at the very least considered differently). For example, if a battery-electric vehicle 102 is likely to be plugged in to a power outlet at the destination, there is minimal concern with the power draw required to transmit data. However, there may be situations where plug-in vehicles 102 should not transmit data (e.g., battery is low relative to the expected upcoming vehicle 102 use). Therefore, there are many situations where some vehicles 102 should be prioritized for data transmission due to battery usage concerns.

In another example, the optimizer 310 may consider the vehicle 102 route and behavior history (as a predictor for the future behavior). This may give an indication of the amount of time the vehicle 102 may be on (particularly relevant for ICE vehicles 102) as well as whether the vehicle 102 will be plugged in at the destination (relevant for battery-electric vehicles 102). The historic driver behavior (e.g., gleaned from the driver behavior metadata 206 received from the vehicles 102) may be used to predict their upcoming behavior, which may correlate to the priority of data transmission. For example, if two ICE vehicles 102 have data that should be transmitted, but there is only bandwidth for one, then (all else being equal) the ICE vehicle 102 that will likely be turned off sooner may be prioritized for earlier data transmission.

In yet another example, the optimizer 310 may consider whether the vehicles 102 have sensed events that fit categories of important events. For example, if a vehicle 102 senses a construction zone, that may be a high priority to transmit to the data center 108 so as to update a map of construction areas to inform other vehicles 102.

In a further example, the optimizer 310 may have a better understanding of road conditions from the data that has been received from other connected vehicles 102 and therefore be able to inform connected vehicles 102 of the priority of the data they are waiting to transmit. For example, one connected vehicle 102 may have sensed an object on a road but may have been unable to capture sufficient data (e.g., images), so for vehicles 102 that are approaching (or just departed) the area of the object, the optimizer 310 may direct the data center 108 to request all data (e.g., images or video) for that area to be prioritized over other data transmissions. As some other possibilities, the vehicle 102 may estimate the importance of the data contained in the vehicle 102 (or may send a summary to the optimizer 310 and ask about the importance) so that higher priority data is sent over the limited potential bandwidth earlier than less important data.

At operation 508, the data center 108 sends the ticket 112 to the vehicles 102. The ticket 112 may accordingly specify the timing and other parameters of the data upload 114 to the vehicle 102. The ticket 112 may be sent by the data center 108 over the communications network 104 to the vehicle 102 for the vehicle 102 to use. The ticket 112 may accordingly contain information about if and when the vehicle 102 should transmit the data upload 114 to the data center 108. The information may include the time (and/or location) that the vehicle 102 should transmit data and what data the vehicle 102 should transmit (e.g., the data center 108 may not require all the collected data from a vehicle 102 for a particular event or roadway).

Figure 6:
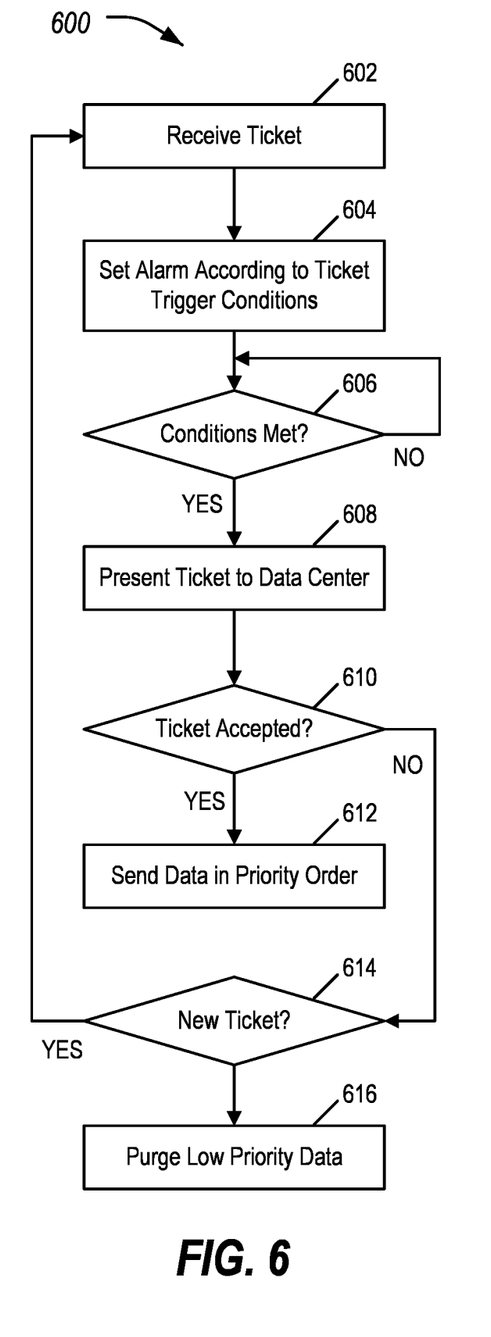
FIG. 6 illustrates an example process including further details of the operation of the vehicle with respect to the data flow diagram.

FIG. 6 illustrates an example process 600 including further details of the operation of the vehicle 102 with respect to the data flow diagram 400. In an example, the process 600 may be performed by the vehicle 102 in the context of the system 100, responsive to the vehicle 102 receiving the ticket 112 in operation 508 of the process 500. As shown at operation 602, the vehicle 102 receives a ticket 112 from the data center 108.

At operation 604, the vehicle 102 sets the alarm 204 according to the conditions specified by the ticket 112. In an example, the vehicle 102 may set the alarm 204 to generate an alert responsive to occurrence of one or more conditions specified by the ticket 112. These conditions may include one or more of the occurrence of date and time specified by a ticket 112, the vehicle 102 being at a location specified by the ticket 112, the vehicle 102 having at least a minimum level of battery charge, the vehicles 102 having its engine in operation, etc. At operation 606, the vehicle 102 waits for the conditions to be satisfied. If the conditions are met control passes to operation 608. If not, control remains at operation 606.

At operation 608, the vehicle 102 presents the ticket 112 to the data center 108. In an example, with the occurrence of the conditions specified by the ticket 112, the vehicle 102 may initiate the sending of the data upload 114 to the data center 108. To ensure the data center 108 will accept the data upload 114, the vehicle 102 may send the ticket 112 to the data center 108 for confirmation.

At operation 610, the vehicle 102 determines whether the ticket 112 is accepted by the data center 108. If the data center 108 is ready to receive the data upload 114 as scheduled via the ticket 112, the data center 108 sends an indication to proceed with the data upload 114 and control passes to operation 612. If not, control passes to operation 614.

At operation 612, the vehicle 102 sends the data upload 114 in accordance with the ticket 112. In one example, the vehicle 102 may perform the data upload 114 by sending data from the vehicle 102 to the data center 108 with the most important data being sent first. As data is sent from the vehicle 102 to the data center 108, the data may be deleted from the storage 202, freeing up the vehicle 102 to collect additional data. In any event, the data upload 114 from the vehicle 102 is provided in accordance with the determination of the optimizer 310, balancing the vehicle 102 data uploads 114 across the cells 106 and other reprices of the system 100. After operation 612, the process 600 ends.

At operation 614, the vehicle 102 determines whether a new ticket 112 was received by the vehicle 102. In an example, the data center 108 may reject the ticket 112 as a new ticket 112 is being provided to the vehicle 102, e.g., based on a further assessment of conditions performed by the optimizer 310. In an example, if the optimizer 310 predicted that the current time and location would be acceptable for the data upload 114, but circumstances have changed, the optimizer 310 may instead cause the data center 108 to send a new ticket 112 to the vehicle 102. If so, control returns to operation 602. If not, then control passes to operation 616.

At operation 616, the vehicles 102 purges low priority data from the storage 202 of the vehicle 102. For example, if the storage 202 becomes full, the vehicle 102 may purge low priority data but keep more important data in case a later data upload 114 is possible. After operation 616 the process 600 ends.

It should be noted that there may be two cases. In a first case, there may be a solution for which all the data may be transferred from the vehicles 102 to the data center 108 in timely fashion. In a second case, there is no theoretical solution to sending all the data to the data center 108, as the volume of data from the vehicles 102 is too large to be accommodated by the bandwidth of the cells 106 of the communications network 104.

In the first case, the data center 108 may provide the tickets 112 to the vehicles 102, indicating when, and where and how much data to send in the data uploads 114. The vehicle 102 may set an alarm 204 based on the ticket 112 and when conditions are met, the vehicle 102 may present the ticket 112 to the data center 108 to verify that the vehicle 102 can send the data upload 114. The data offload may then start while meeting the specification of the ticket 112. The vehicle 102 may offload the highest priority data first.

In the second case, as there is no theoretical solution found, the data center 108 may prioritize which data to obtain from each vehicle 102, and when, and will include this information in the provided ticket 112. The vehicle 102 may then send the high priority data as indicated by the ticket 112 and then not send lower priority data. This may allow for the balancing of the load on the cells 106 and servers of the data center 108 receiving the data uploads 114. Regarding the cells 106, there may be a centralized agency, an owner or operator of the cells 106, which provides bandwidth information and provides bandwidth as commodity (e.g., as futures). The data center 108 operator may request certain bandwidth in advance based on the tickets 112 provided to the vehicles 102. That request may provide the service provider managing the cells 106 with information on potential bottlenecks.

Figure 7:
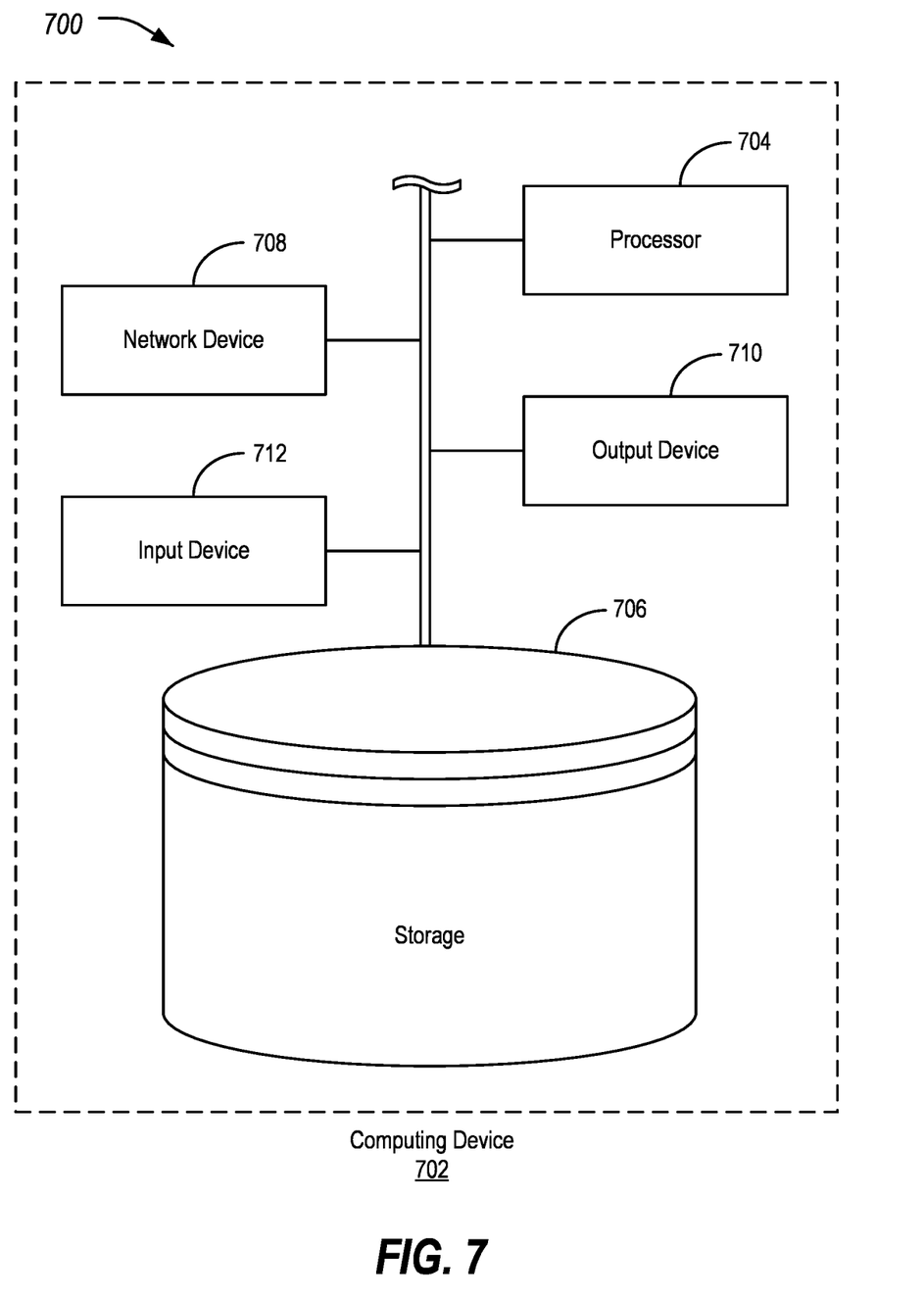
FIG. 7 illustrates an example of a computing device for intelligent ticketing and data offload planning for connected vehicles.

FIG. 7 illustrates an example 700 of a computing device 702 for intelligent ticketing and data offload planning for connected vehicles 102. Referring to FIG. 7, and with reference to FIGS. 1-6, the hardware performing the operations of the vehicles 102 and the data center 108 may include examples of such a computing device 702. As shown, the computing device 702 may include a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families. In some examples, a neural processing unit (NPU) may be applied, e.g., if pretrained machine learning models are being used.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable computing device 702 to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

Computing devices described herein, such as the vehicles 102 and the data center 108, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic™, JavaScript, Python, Perl, structured query language (SQL), etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A data center for intelligent ticketing and data offload planning, comprising:
a storage for maintaining data uploads; and
a computing device programmed to execute an optimizer to perform operations including to:
receive a ticket request from a vehicle requesting to perform a data upload of vehicle data over a communications network,
utilize the optimizer to generate a ticket, the ticket specifying a time and a location for the vehicle to perform the data upload,
send the ticket to the vehicle,
receive the ticket from the vehicle, the ticket being presented by the vehicle responsive to occurrence of the time and the vehicle being at the location,
validate the ticket to ensure that the vehicle should still perform the data upload,
responsive to the optimizer confirming that the data upload can proceed, indicate to the vehicle to perform the data upload over the communications network
responsive to determining that the ticket is valid but that network conditions have changed, deny the ticket and send a second ticket to the vehicle specifying a second time and a second location for the vehicle to perform the data upload,
receive the second ticket from the vehicle, the second ticket being presented by the vehicle responsive to occurrence of the second time and the vehicle being at the second location,
validate the second ticket to ensure that the vehicle should still perform the data upload,
indicate to the vehicle to perform the data upload over the communications network responsive to the optimizer confirming that the data upload can proceed according to the second ticket, and
store the data upload to the storage.

2. The data center of claim 1, wherein the computing device is further programmed to utilize the optimizer to specify a subset of the vehicle data to be uploaded, the subset including data deemed to be higher priority by the computing device.

3. The data center of claim 1, wherein the computing device is further programmed to receive driver behavior metadata with the ticket request, the driver behavior metadata specifying behavior history of the vehicle in terms of days of the week, times of day, and locations, and the optimizer is programmed to schedule the data upload at the time and the location in accordance with the vehicle being in operation at the time and the location according to the behavior history.

4. The data center of claim 1, wherein the computing device is further programmed to:
maintain information with respect to a maximum bandwidth available to each of a plurality of cells of the communications network; and
schedule the data upload at the time and the location to ensure that a total bandwidth of at least one of the plurality of cells serving the data upload is within the maximum bandwidth.

5. The data center of claim 1, wherein the computing device is further programmed to deny the data upload responsive to determining that the ticket is invalid.

6. A method for intelligent ticketing and data offload planning, comprising:
receiving, to a data center, a ticket request from a vehicle requesting to perform a data upload of vehicle data over a communications network;
utilizing an optimizer to generate a ticket, the ticket specifying a time and a location for the vehicle to perform the data upload;
sending the ticket to the vehicle;
receiving the ticket from the vehicle, the ticket being presented by the vehicle responsive to occurrence of the time and the vehicle being at the location;
validating the ticket to ensure that the vehicle should still perform the data upload;
indicating to the vehicle to perform the data upload over the communications network responsive to the optimizer confirming that the data upload can proceed;
responsive to determining that the ticket is valid but that network conditions have changed, denying the ticket and sending a second ticket to the vehicle specifying a second time and a second location for the vehicle to perform the data upload;
receiving the second ticket from the vehicle, the second ticket being presented by the vehicle responsive to occurrence of the second time and the vehicle being at the second location;
validating the second ticket to ensure that the vehicle should still perform the data upload;
indicating to the vehicle to perform the data upload over the communications network responsive to the optimizer confirming that the data upload can proceed according to the second ticket; and
storing the data upload to a storage of the data center.

7. The method of claim 6, further comprising utilizing the optimizer to specify a subset of the vehicle data to be uploaded, the subset including data deemed to be higher priority by the data center.

8. The method of claim 6, further comprising receiving driver behavior metadata with the ticket request, the driver behavior metadata specifying behavior history of the vehicle in terms of days of the week, times of day, and locations, and the optimizer is programmed to schedule the data upload at the time and the location in accordance with the vehicle being in operation at the time and the location according to the behavior history.

9. The method of claim 6, further comprising:
maintaining information with respect to a maximum bandwidth available to each of a plurality of cells of the communications network; and
scheduling the data upload at the time and the location to ensure that a total bandwidth of at least one of the plurality of cells serving the data upload is within the maximum bandwidth.

10. The method of claim 6, further comprising denying the data upload responsive to determining that the ticket is invalid.

11. The method of claim 6, further comprising:
receiving the ticket by the vehicle;
setting an alarm by the vehicle to signal the vehicle to perform the data upload responsive to occurrence of the time and the location; and
sending the ticket to the data center responsive to the alarm signaling the occurrence.

12. A non-transitory computer-readable medium comprising instructions for intelligent ticketing and data offload planning that, when executed by one or more computing devices, cause the one or more computing devices to perform operations including to:
- receive, to a data center, a ticket request from a vehicle requesting to perform a data upload of vehicle data over a communications network;
- utilize an optimizer to generate a ticket, the ticket specifying a time and a location for the vehicle to perform the data upload;
- send the ticket to the vehicle;
- receive the ticket from the vehicle, the ticket being presented by the vehicle responsive to occurrence of the time and the vehicle being at the location;
- validate the ticket to ensure that the vehicle should still perform the data upload;
- indicate to the vehicle to perform the data upload over the communications network responsive to the optimizer confirming that the data upload can proceed;
- responsive to determining that the ticket is valid but that network conditions have changed, deny the ticket and send a second ticket to the vehicle specifying a second time and a second location for the vehicle to perform the data upload;
- receive the second ticket from the vehicle, the second ticket being presented by the vehicle responsive to occurrence of the second time and the vehicle being at the second location;
- validate the second ticket to ensure that the vehicle should still perform the data upload;
- indicate to the vehicle to perform the data upload over the communications network responsive to the optimizer confirming that the data upload can proceed according to the second ticket; and
- store the data upload to a storage of the data center.

13. The medium of claim 12, further comprising instructions that, when executed by the one or more computing devices, cause the one or more computing devices to perform operations including to utilize the optimizer to specify a subset of the vehicle data to be uploaded, the subset including data deemed to be higher priority by the data center.

14. The medium of claim 12, further comprising instructions that, when executed by the one or more computing devices, cause the one or more computing devices to perform operations including to receive driver behavior metadata with the ticket request, the driver behavior metadata specifying behavior history of the vehicle in terms of days of the week, times of day, and locations, and the optimizer is programmed to schedule the data upload at the time and the location in accordance with the vehicle being in operation at the time and the location according to the behavior history.

15. The medium of claim 12, further comprising instructions that, when executed by the one or more computing devices, cause the one or more computing devices to perform operations including to:
- maintain information with respect to a maximum bandwidth available to each of a plurality of cells of the communications network; and
- schedule the data upload at the time and the location to ensure that a total bandwidth of at least one of the plurality of cells serving the data upload is within the maximum bandwidth.

16. The medium of claim 12, further comprising instructions that, when executed by the one or more computing devices, cause the one or more computing devices to perform operations including to deny the data upload responsive to determining that the ticket is invalid.

17. The medium of claim 12, further comprising instructions that, when executed by the one or more computing devices, cause the one or more computing devices to perform operations including to:
- receive the ticket to the vehicle;
- set an alarm by the vehicle to signal the vehicle to perform the data upload responsive to occurrence of the time and the location; and
- send the ticket to the data center responsive to the alarm signaling the occurrence.

\* \* \* \* \*